United States Patent [19]

Huber

[11] Patent Number: 4,698,938

[45] Date of Patent: Oct. 13, 1987

[54] DRIVE MECHANISM FOR FULLY-AUTOMATIC OPENING AND CLOSING OF A SLIDING DOOR

[76] Inventor: Jakob Huber, Les Aveneyres 8, 1896 St. Légier, Switzerland

[21] Appl. No.: 803,075

[22] Filed: Nov. 29, 1985

[30] Foreign Application Priority Data

Feb. 11, 1985 [CH] Switzerland .............................. 612/85

[51] Int. Cl.⁴ ............................................... E05F 15/00
[52] U.S. Cl. ........................................ 49/138; 49/362; 49/118; 49/370
[58] Field of Search ................. 49/138, 362, 100, 370, 49/118, 120

[56] References Cited

U.S. PATENT DOCUMENTS

| | | | |
|---|---|---|---|
| 2,673,316 | 3/1954 | Doeg et al. ........................ | 49/138 X |
| 3,834,081 | 9/1974 | Catlett . | |
| 4,067,144 | 1/1978 | Ogishi ............................... | 49/138 X |
| 4,304,071 | 12/1981 | Obrecht ............................. | 49/370 X |

FOREIGN PATENT DOCUMENTS 0015851 9/1980 European Pat. Off. .
2417620 9/1979 France .

Primary Examiner—Kenneth Downey
Attorney, Agent, or Firm—Werner W. Kleeman

[57] ABSTRACT

A drive mechanism for full-automatic opening and closing of a sliding door comprises two drive mechanisms for supplying different moving speeds to the door. A main motor for the higher speed drives a worm-gear spindle, a low-power motor for the lower speed drives a profiled bar. A gear wheel moving on the worm-gear spindle and a pinion slideably mounted on the profiled bar mesh with each other and are contained in a sliding carriage guiding the sliding door via a latch. The selective or common drive of both motors results in various combinations and enables an adaptation to the requirements for variable door speeds. The drive mechanism is of simple design, relatively cheap and does not require trained service personnel.

24 Claims, 3 Drawing Figures

DRIVE MECHANISM FOR FULLY-AUTOMATIC OPENING AND CLOSING OF A SLIDING DOOR

BACKGROUND OF THE INVENTION

The present invention broadly relates to a drive mechanism for fully automatic opening and closing of at least one sliding door and more specifically, for a sliding door which is movable with a greater speed on the initial and preferably major portion of the opening and closing path than on the terminal and preferably minor portion, and which is mobile by means of a coupling device.

For moving sliding doors it is known to the state-of-art to perform the major or initial portion of the sliding path with a greater speed than the remainder of the sliding path.

The reason for such variable movement of the door can be seen in the fact that the door should open very fast and, especially during the cold season, should also close rapidly. In order to avoid a collision of both parts of a double-wing or double-panel door, or that a single-wing or single-panel door collide excessively hard with a confronting wall, the closing speed is reduced in the minor or terminal part of the closing path.

Various drive mechanisms are used to provide such differential speeds. However, they all display numerous disadvantages. The use of pneumatic pistons (pneumatic drive) or hydraulic pistons (hydraulic drive) requires the availability of compressed air or pressurized oil, respectively, for which relatively great technical expenditure is required. In the first case the compressor causes undesirable noise, and in case of a hydraulic drive leaking oil can cause contamination.

Furthermore, various mechanical drives are known. For example, an electric motor can drive an open-link chain or a rubber chain, or toothed belt extending over the entire travel path of the door or door panel.

The regulation of the motor into slow revolutions and even to zero revolutions requires a great number of electronic components. In case of breakdown of the sensitive electronic control an expert from outside has to be called since the normal skilled service personnel does not have the knowledge necessary for repairing the damage.

SUMMARY OF THE INVENTION

It is a primary object of the present invention to create a control mechanism for doors of the aforementioned kind, by which with ordinary means variable speeds can be accomplished, and which can be manufactured at reasonable costs.

The aforementioned task is accomplished by a main shaft driven by a main motor to provide a high speed, and by an auxiliary shaft driven by a motor of relatively low output to provide a low speed of the door. Both motors act on the same follower means.

By the functional separation or providing various speeds by applying two motors, a high reliability and a large safety factor is assured, and furthermore, various combinations for different operational conditions are possible. Beyond a few conventional switching gears no other complicated and expensive installations are required. In case of a malfunction any generally educated and trained artisan can repair the damage.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
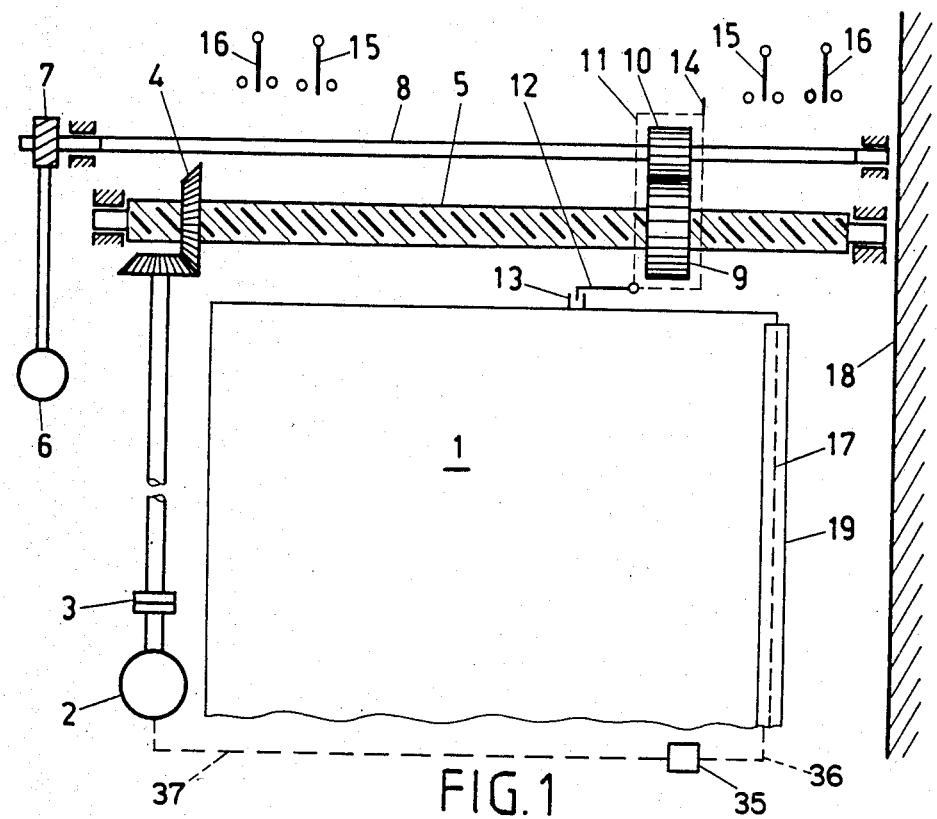
FIG. 1 shows a drive mechanism for a single-wing or single-panel sliding door.

According to FIG. 1 a single-wing or single-panel sliding door 1 is moved by two electric motors 2 and 6 in order to attain in a simple manner the necessary differential door speeds. The main motor 2 drives a transmission 3, and through bevel gearing 4 a rotatable main shaft, here a worm-gear spindle 5. The transmission 3 also comprises a release or slip clutch, for example a rubber or plastic drive belt. The main shaft or worm-gear spindle 5 is arranged substantially horizontally and substantially parallels to the direction of movement or actuating direction of the door or door panel 1. The relatively low-power or low-output auxiliary motor 6 drives a rotatable countershaft or auxiliary shaft 8 via a worm drive 7. The countershaft or auxiliary shaft 8 is a profile bar and turns or rotates synchronously with the main shaft or worm-gear spindle 5.

On the main shaft or worm-gear spindle 5 a gear wheel 9 is arranged which is equipped with an internal thread mating the main shaft or worm-gear spindle 5. A pinion 10 is slidably mounted on the profile bar of the auxiliary shaft 8. The profile bar of the auxiliary shaft 8 must be selected appropriately, for example as a round shaft with a groove or keyway, as a wedge or triangular profile or the like, in order to transmit the torque of the low-power motor 6 without difficulties, especially without causing deformations thereof relative to the pinion 10, the slidability of which must be maintained.

The gear wheel 9 and the pinion 10 are enclosed in a box-like sliding carriage 11, which in turn is used as a follower or entrainment member for effecting the desired door movement, and which furthermore safeguards that the gear wheel 9 and the pinion 10 remain in permanent engagement with each other during sliding or turning movements. In this embodiment the sliding carriage 11 is not directly connected to the door, but indirectly by means of an articulated latch 12 engaging a holder 13 on the door or door panel 1. It is appropriate to have the door or door panel 1 running in a (not shown) guide rail on rollers.

The drive mechanism according to the invention offers various possibilities to open or close the door. One of the possibilities of the closing procedure is described as follows:

The main motor 2 is switched-on, the worm-gear spindle 5 is rotated but the gear wheel 9 is prevented from turning by the stationary pinion 10. Consequently, both the gear wheel 9 and the pinion 10 to carried or held by the sled or box-like sliding carriage 11 slide in axial direction only and drive the door or door panel 1 via the sled or box-like sliding carriage 11 and latch 12 with relatively high speed toward the right (as seen in FIG. 1).

As soon as the door or door panel 1 has moved through the major portion of its travel, a nose 14 attached to the sled or box-like sliding carriage 11 meets a selector or reversing switch 15. Thereby, the main motor 2 is switched-off and simultaneously the low-power motor 6 is switched-on. The further travel of the door 1 is now performed at a lower speed through the last part or terminal portion of the travel path until the door or door panel 1 is closed. During this time, the profile bar of the auxiliary shaft 8 with its rotational speed greatly decreased or reduced relative to the low-power motor 6 by means of the worm drive 7 turns the pinion 10. Since the pinion 10 meshes with the gear wheel 9, the pinion 10 is shifted on the stationary worm-gear spindle 5 in the closing direction of the door or door panel 1 and moves the door or door panel 1 via the sled or box-like sliding carriages 11 and the latch 12. The movement is finished or terminated as soon as the nose 14 enters into contact with a limit switch 16, which disconnects the low-power motor 6. For the protection against damage of a closing edge 17 of the door or door panel 1 when striking the wall 18, an elastic protecting strip 19 is attached to the door or door panel 1.

Such an elastic protecting strip can also be arranged on the opposite door edge.

Accordingly, the opening procedure is performed in the same manner. For example, the reversible main motor 2 is switched-on, for example by means of a foot-operated switch, arranged for instance under the floor covering. The main motor 2 drives the door or door panel 1 with greater speed over the major or initial portion or stretch of the opening-path, until the nose 14 of the sled or box-like sliding carriages 11 enters into contact with the selector or reversing switch 15, arranged on the opposite end of the path. The selector or reversing switch 15 disconnects the main motor 2 and switches-on the low-power motor 6. By this measure, the door or door panel 1 is driven at a reduced speed through the last or terminal portion of the opening path until the final position at the greatest opening width is reached. Then, the low-power motor 6 is disconnected by the limit switch 16, arranged at the terminal point. Normally, the door or door panel 1 is to remain open only for a limited period of time, and is to close again automatically. This can be achieved by means of a timing relay which switches-on the main motor 2 after a preset time, whereby the closing procedure will be initiated.

This switching arrangement also makes possible the so-called "pharmacy switching" mode, during which for safety reasons the door is opened only for a narrow gap to enable the handing-over of a recipe and/or the money. In this case the main motor 2 remains disconnected which can be operated or performed in a simple way by means of an on/off-switch in a circuit of a main switch. Thereby, the low-power motor 6 operates only during the last or terminal portion of the opening path and is sufficient of this purpose, as well as for the corresponding closing procedure. The door movements can be initiated by a manual switch; the reversing switch 15 and the limit switch 16 perform the limitation of the stroke.

Especially advantageous in the "pharmacy switching" mode is the self-locking of at least part of the driving elements of the door or door panel 1 in order to prevent a forced opening of the door or door panel 1 by applying thrust against the closing edge 17. To achieve this, for example the worm-gear spindle 5 with the gear wheel 9 or the worm drive 7 are best applicable. Also other elements can be devised as a self-locking element. The self-locking will also be assisted by friction, inertia and other resistances of all transmission parts or components, including the motors 2 and 6.

Another switching arrangement of the door drive mechanism according to the invention consists of the simultaneous connection of both motors 2 and 6 for the major or initial portion of the door path.

In this case, the gear wheel 9 will not only be axially moved but is also turned or rotated by means of the pinion 10. Thus the total speed resulting from both motor drives is imparted to the sled or box-like sliding carriage 11 and thereby also for the door or door panel 1. After completing the major or initial portion of the path of travel of the door or door panel 1 the reversing switch 15 disconnects the main motor 2 and the door or door panel 1 is moved further by the low-output or low-power motor 6 until the low-power motor 6 is connected by the limit switch 16. In case of a malfunction of the main motor 2, the low-power motor 6 can move the door or door panel 1 alone over the entire opening or closing path, but at a reduced speed.

According to another embodiment of the inventive switching and drive mechanism, the low-power motor 6 can permanently remain switched-on, even after reaching the final or terminal position of the door or door panel 1. Thus on the one hand the door or door panel 1 is held open, while on the other hand a closing thrust is applied to the closed door part or portion. In this case the low-power motor 6 will be stalled.

Therefore, the low-power motor 6 must be designed either for a 100% duration of connection or must be reduced to a lower voltage. Another possibility exists in arranging a known release or slip clutch between the low-power motor 6 and the worm drive 7.

Figure 3:
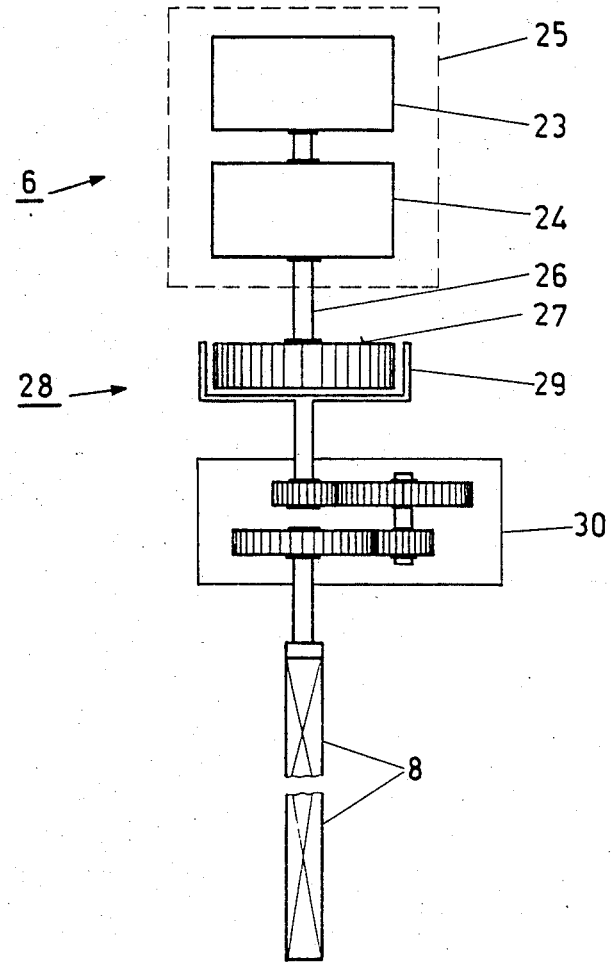
FIG. 3 shows a detail of the drive mechanism.

The disadvantage of such release or slip clutches is the voluminous design as well as the relatively great heating and wear, especially under large demand resulting from a closed door for a longer period of time. A better solution would a magnetic release clutch, as shown in FIG. 3 and described hereinbelow.

Furthermore, a combination of both aforementioned designs is possible, wherein the door or door panel 1 is moved the major or initial portion or part of the path by the main motor 2 and is moved by the low-power motor 6 on the last or terminal portion of the path, but on the opening path initially by both motors, and on the last or terminal portion of the path by the low-power motor 6 alone. This results in a greater door-speed at the opening path than at the closing end of the path.

The elastic protecting strip 19 protects the closing edge 17 of the door or door panel 1 from damage, especially for doors mostly being designed of glass. But it also serves for the protection of people using the door.

An advantageous embodiment is a hollow elastic protecting strip 19 which is connected by a tube line or conduit 36 to a diaphragm switch 35. Upon a thrust onto the elastic protecting strip 19, the diaphragm switch 35 is activated and the opening movement of the door is initiated via an electrical conductor 37. This is primarily a safety measure in order to avoid the squeezing of a person. Naturally, the diaphragm switch 35 must be disconnected directly before the final closing position of the door, in order to avoid continuous opening and closing of the door.

Still another function can be taken-over by the diaphragm switch 35. It remains switched-on during night time when the door is closed, but the opening mechanism of the door is disconnected. When trying to pry the door open by tools entered at the protecting strip, the pressure in the strip increases and affects the diaphragm switch 35 which in turn in connection with an additional switch of the same kind, releases an alarm.

For an emergency opening, the door or door panel 1 is released by the latch 12 from the sled or box-like sliding carriages 11 and is easily movable. The releasing can be performed either by a solenoid or, in case of power failure, by hand. Thus in case of fire in a store or a theatre it cannot happen that panic break-out due to half-opened or half-closed doors. The releasing device can also be connected to the fire protection installation in such buildings.

Figure 2:
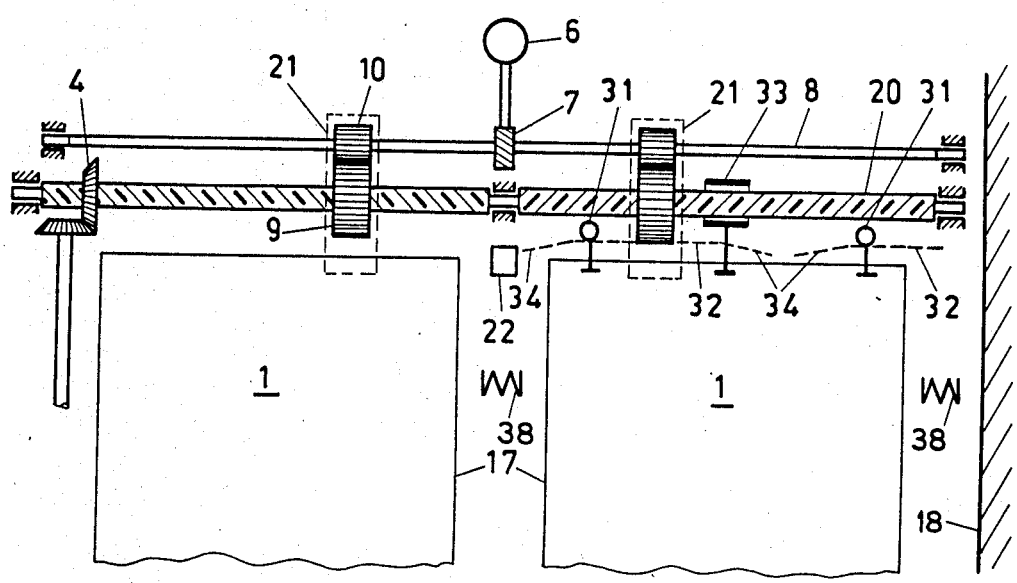
FIG. 2 shows a drive mechanism for a double-wing or double-panel sliding door.

FIG. 2 shows an example for the drive mechanism of a double-wing or double-panel door. The installation and mode of operation are practically equivalent to the embodiment shown in FIG. 1. In order to avoid two separated drive mechanisms which in the long run would be difficult to operate synchronously, a worm-gear spindle 20 is provided with a left-hand thread for one door or door panel 1, and with a right-hand thread for the other door or door panel 1. Thereby, both doors or door panels 1 are opened or closed symmetrically to each other when the worm-gear spindle 20 is rotated.

In this embodiment the doors or door panels 1 are directly connected to the appropriate follower, here a box-like sliding carriage or sled 21 serving as a follower or entrainment member and comprising the gearwheel 9 and the pinion 10.

This arrangement allows not only the guidance of the doors or door panels 1, but also that they be suspended from the worm-gear spindle 20. It is advisable to use square threads or trapezoidal threads for the worm-gear spindle 20.

To protect both door edges 17, a shock absorber 22 is provided to absorb the inertial energy of the doors. Such shock absorber 22 usually is also arranged at the end of the opening path for each door or door panel 1. Also the elastic protecting strip 19 according to FIG. 1 can be used. In FIG. 2 the profile rod of the auxiliary shaft 8 is driven by the worm drive 7, arranged in the center. For the speed reduction of the low-power motor 6 also a toothed-wheel, i.e. a gear transmission, could be provided. The same applies to the drive of the worm-gear spindle 20. Here, the main motor 2 and the low-power motor 6 could be arranged either beside or in alignment with the worm-gear spindle 20. The use of bevel gearing 4 could be of advantage if the doors or door panels 1 are situated on the ground floor, and the main motor 2 is located in the basement.

Providing worm-gear spindle 20 with square or trapezoidal threads allows an additional means for decreasing the door speed upon approaching one of the final or terminal positions. The door or door panel 1 is attached to rollers 31 moving on a track 32. A braking device 33 embracing the worm-gear spindle 20 freely moves with the door or door panel 1. Towards the ends 34, the track 32 slightly dips downwards. As soon as the rollers 31 get close to the lower end parts 34 of the track 32, the door or door panel 1 is lowered, and the braking device 33 is activated and affects the turning or rotating worm-gear spindle 20. Thereby the kinetic energy is transformed into heat, similar to an automotive brake. The braking is greatly advantageous compared to the use of elastic protecting strips or of shock absorbers, as is commonly known and has been described before.

A similar embodiment is possible if the final portions 34 of the track 32 are slightly sloped upwards. Upon running-up of the rollers 31, the doors or door panels 1 are lifted upwards. The energy for this running-up derives from the kinetic energy of the moving parts and contrary to the aforementioned example, is absorbed not only by the braking device 33 but additionally by lifting the door weight.

A further possibility consists in using a guide roller running on a special track and connected by a lever directly to the door or door panel 1 or with the follower 11 or 21. Before reaching the final or terminal position of the door or door panel 1, the lever actuates a brake, similar to the braking device 33, or a disc brake.

A braking effect of the door or door panel 1 approaching the final or terminal position with another completely different principle can be obtained by means of a spring 38. This can be either a compression spring or a tension spring, acting against or counter to the movement of the door or door panel 1, such as a helical or spiral spring 38 enclosing the worm-gear spindle 5 or 20, whereby the worm-gear spindle 5 or 20 supplies the torsional thrust and simultaneously applies a braking force. Also combinations of the aforementioned embodiments are possible. The energy accumulated in the spring 38 during a standstill of the worm-gear spindle 5 or 20 released as soon as the movement of the door or door panel 1 in the counter-direction starts. Thereby, the spring force assists the power of the motor in the starting phase of the door movement. However, it can also act on its own, which is especially desirable during a power failure.

All braking devices mentioned before can be applied to both single and double-wing or single and double-panel doors.

FIG. 3 shows a motor drive for the auxiliary shaft 8 with a magnetic back-gear sliding pinion. The low-power motor 6 comprises a forward synchronous motor 23 and a reverse synchronous motor 24, arranged on a common shaft 26 in a housing 25. On the same shaft 26 a rotor 27 of the magnetic drive clutch or dragging element 28 is mounted, together with a follower part or member 29 embracing the rotor 27. The follower part or member 29 is connected to a transmission 30, which reduces the speed of the profile rod of the auxiliary shaft 8 connected to its output side.

Between the follower part or member 29 and the rotor 27, either one or both of which can be natural or permanent magnets, no mechanical connection exists; the torque is transmitted only by the magnetic field of the magnetic drive clutch 28 or dragging element. No limit switch disconnects the motor as soon as the door or door panel 1 arrives in the final or terminal position, but the low-power motor 6 can continue to operate without excessive heating or overheating. The slip between the driving and driven components is limited to the magnetic drive clutch or dragging element 28 in which no heat of friction can develop due to there being no contact with each other of both corresponding parts or members 27 and 29.

The desired closing thrust to ensure a tight closing of the door or door panel 1 is obtained by the low-power motor drive 6, as described in FIG. 3.

It will be noted that all switching arrangements and design details described in connection to FIG. 1 can also be used for the embodiment according to FIG. 2. This also applies the other way.

Furthermore, other applications of the fully automatic drive mechanism are possible, for example in any machinery for a fast and exact positioning and guidance of a work piece.

While there are shown and described present preferred embodiments of the invention, it is to be distinctly understood that the invention is not limited thereto, but may be otherwise variously embodied and practiced within the scope of the following claims. Accordingly,

I claim:

1. A drive mechanism for fully automatically opening and closing at least one sliding door, which is movable with a greater speed in the major initial portions of the opening and closing paths than in the minor terminal portions, comprising:
   a main shaft;
   a coupling device;
   a main motor for driving said main shaft through said coupling device to provide the greater speed;
   an auxiliary shaft;
   a relatively low-power motor driving said auxiliary shaft to transmit the lower speed to the at least one sliding door;
   a common follower member; and
   both shafts acting on said common follower member.

2. The drive mechanism as defined in claim 1, wherein:
   in a major initial portion of each door path both said motors operate together; and
   in a minor terminal portion of each door path only said relatively low-power motor is switched-on.

3. The drive mechanism as defined in claim 2, wherein:
   said relatively low-power motor operates continuously even after reaching a terminal position of said at least one sliding door.

4. The drive mechanism as defined in claim 1, wherein:
   said main motor operates in the major initial portion of the opening and closing path of each said at least one door; and
   said relatively low-power motor operating only in the minor terminal portion thereof.

5. The drive mechanism as defined in claim 4, wherein:
   to open and close a narrow gap of said at least one door said relatively low-power motor in the terminal portion of the closing path of said at least one door can be switched-on and off while said main motor is disconnected.

6. The drive mechanism as defined in claim 1, further including:
   one reversing switch for each of the opening procedure and the closing procedure for changing into the lower speed after said at least one sliding door has passed said major initial portion of the path.

7. Drive mechanism for fully-automatic opening and closing of at least one sliding door, which is movable with a greater speed on the prevailing partial opening and closing path than on the last part, and which is movable by means of a coupling device, characterized by:
   one main motor driving a main shaft to provide the high speed;
   a low-output motor driving a profiled bar to transmit the low speed of the door;
   both shafts act onto the same follower;
   a gear wheel with an internal thread positioned on said main shaft;
   said main shaft being designed as a worm-gear spindle;
   said gear wheel permanently meshing with a pinion;
   said pinion being slidably arranged on said profiled bar acting as an auxiliary shaft; and
   said gear wheel and said pinion being arranged in a box-like sled serving as the follower to move the door.

8. The drive mechanism as defined in claim 7, wherein:
   driving elements acting on said gear wheel and on said pinion are at least partially irreversible in view of the movement initiated by said at least one sliding door.

9. The drive mechanism as defined in claim 7, further including:
   a releasable latch connecting said at least one sliding door with said box-like sled.

10. The drive mechanism as defined in claim 7, wherein:
    said worm-gear spindle has a square thread or a trapezoidal thread which serves as a guide for said at least one sliding door suspended therefrom.

11. A drive mechanism for a double-panel door as defined in claim 7, wherein:
    said main shaft designed as a worm-gear spindle is provided with a right-hand thread and a left-hand thread; and
    said worm-gear spindle being provided with one said box-like sled for each counter-movement of the door panels of said double-panel door.

12. The drive mechanism as defined in claim 1, wherein:
    both motors are reversible.

13. Drive mechanism for fully-automatic opening and closing of at least one sliding door, which is movable with a greater speed on the prevailing partial opening and closing path than on the last part, and which is movable by means of a coupling device, characterized by:
    one main motor driving a main shaft to provide the high speed;
    a low-output motor driving a profiled bar to transmit the low speed of the door;
    both shafts act onto the same follower; and
    a release clutch arranged between said main motor and said main shaft driven thereby.

14. Drive mechanism for fully-automatic opening and closing of at least one sliding door, which is movable with a greater speed on the prevailing partial opening and closing path than on the last past, and which is movable by means of a coupling device, characterized by:
    one main motor driving a main shaft to provide the high speed;
    a low-output motor driving a profiled bar to transmit the low speed of the door;
    both shafts act onto the same follower; and
    said low-output motor comprising a motor for forward rotation and a motor for reverse rotation and both motors being integrated in a common housing.

15. Drive mechanism for fully-automatic opening and closing of at least one sliding door, which is movable with a greater speed on the prevailing partial opening and closing path than on the last part, and which is movable by means of a coupling device, characterized by:
- one main motor driving a main shaft to provide the high speed;
- a low-output motor driving a profiled bar to transmit the low speed of the door;
- both shafts act onto the same follower;
- a magnetic drive clutch acting as a coupling between said low-output motor and the profiled bar defining an auxiliary shaft driven thereby; and
- said magnetic drive clutch transmitting without mechanical connection forward and reverse rotation of said low-output motor by means of a magnetic field to said profiled bar defining said auxiliary shaft.

16. The drive mechanism as defined in claim 1, further including:
- a shock absorber arranged at the end of each door path for nullifying the kinetic energy of said at least one sliding door.

17. The drive mechanism as defined in claim 1, further including:
- an elastic protection strip arranged on each vertical edge of said at least one sliding door.

18. The drive mechanism as defined in claim 17, further including:
- a diaphragm switch actuated by pressure on said hollow protecting strip on a closing edge of said at least one sliding door by which the opening movement is initiated.

19. The drive mechanism as defined in claim 18, wherein:
- the operation of said diaphragm switch is annuled immediately before the closing point of said at least one sliding door.

20. Drive mechanism for fully-automatic opening and closing of at least one sliding door, which is movable with a greater speed on the prevailing partial opening and closing path than on the last part, and which is movable by means of a coupling device, characterized by:
- one main motor driving a main shaft to provide the high speed;
- a low-output motor driving a profiled bar to transmit the low speed of the door;
- both shafts act onto the same follower;
- a track on which rollers carrying the weight of said at least one sliding door move;
- said track being slightly bent at its ends; and
- a braking device acting as a brake for said main shaft as soon as said rollers arrive at said ends.

21. The drive mechanism as defined in claim 1, further including:
- a spring loaded by braking of said at least one sliding door approaching a terminal position.

22. A drive mechanism for automatically actuating at least one sliding door panel, comprising:
- first drive means including a main drive motor;
- second drive means including an auxiliary drive motor;
- a rotatable main shaft driven by said first drive means and defining an actuation direction;
- a rotatable auxiliary shaft driven by said second drive means and extending substantially parallel to said actuation direction;
- entrainment means engaging said at least one sliding door panel for imparting motion thereto in said actuation direction; and
- said entrainment means including actuating means cooperating with said rotatable main shaft and said rotatable auxiliary shaft such that rotation of said rotatable main shaft at a predetermined speed of rotation and immobility of said rotatable auxiliary shaft causes said entrainment means to translate in said actuation direction at a predetermined speed of translation and such that rotation of said rotatable auxiliary shaft modifies said predetermined speed of translation.

23. The drive mechanism as defined in claim 22, further including:
- control means for controlling said auxiliary drive motor in dependence of said motion imparted to said at least one sliding door panel such that said predetermined speed of translation is modified by rotation of said rotatable auxiliary shaft in the sense of a reduction of said predetermined speed of translation both when said at least one sliding door panel approaches termination of an opening motion and when said at least one sliding door panel approaches termination of a closing motion.

24. The drive mechanism as defined in claim 22, wherein:
- said at least one sliding door panel comprises two sliding door panels arranged to mutually open and close;
- said entrainment means engaging said at least one sliding door panel comprising a respective entrainment means for each of said two sliding door panels; and
- said respective entrainment means cooperating with said main shaft such that rotation of said rotatable main shaft and immobility of said rotatable auxiliary shaft causes said respective entrainment means to translate in mutually opposite senses in said actuation direction.

* * * * *

UNITED STATES PATENT OFFICE
CERTIFICATE OF CORRECTION

PATENT NO. : 4,698,938
DATED : October 13, 1987
INVENTOR(S) : JAKOB HUBER

It is certified that error appears in the above-identified patent and that said Letters Patent are hereby corrected as shown below:

Claim 1, Column 7, line 26, after "speed" delete "to" and insert --of--

Signed and Sealed this

Twenty-second Day of March, 1988

Attest:

DONALD J. QUIGG

Attesting Officer     Commissioner of Patents and Trademarks